Nov. 18, 1969        A. GLASSMAN        3,479,567
MODULAR ELECTRICAL SWITCH AND FUSE BOX HAVING MEANS
FOR CONNECTING TO LIKE BOXES
Filed Oct. 23, 1968

INVENTOR.
AARON GLASSMAN

United States Patent Office 3,479,567
Patented Nov. 18, 1969

3,479,567
MODULAR ELECTRICAL SWITCH AND FUSE BOX HAVING MEANS FOR CONNECTING TO LIKE BOXES
Aaron Glassman, Scranton, Pa., assignor to Pennsylvania Sewing Research Corporation, a corporation of Pennsylvania
Continuation-in-part of application Ser. No. 518,135, Jan. 3, 1966. This application Oct. 23, 1968, Ser. No. 769,837
Int. Cl. H02b 1/04, 9/00
U.S. Cl. 317—114          4 Claims

ABSTRACT OF THE DISCLOSURE

A modular electrical unit comprised of a metal box having therein a fuse mounting, a wall-mounted switch and a wall-mounted jumper receptacle. A flexible cable, having a plug at the external end thereof, enters the box and connects to the line side of the switch. The load side of the switch is connected to the line side of the fuse mounting. Means for connecting a load enters the box and connects to the load side of the fuse mounting, and the jumpers receptacle is connected to the line side of the switch.

Cross reference to related applications

This is a continuation-in-part-of patent application Ser. No. 518,135 filed Jan. 3, 1966, now abandoned by the same applicant and having the same assignee hereof.

Background of the invention

This invention relates to a modular electrical switch and fuse box which provides also a receptacle for connecting to a like modular box.

It is common practice, particularly in the sewing industry, that each machine on the factory floor have its own electric motor. As the needs of the factory change, the number of machines are increased or decreased or are changed in their locations with respect to each other. To provide flexibility, the machines are connected to the power line through flexible cables which are plugged into a receptacle. At least for reasons of safety, each receptacle is supplied through a separate set of fuses and a separate cut-off switch. Most factory buildings are not wired with this equipment at most locations where they are required. Each time the factory machines are rearranged, wiring must be installed for the new arrangement. The usual permanent type of wiring is expensive and a considerable amount of the hardware of previous installations must be scrapped.

An object of this invention is to provide a novel modular switch and fuse unit.

Another object is to provide a switch and fuse unit to which similar units may be added.

A further object is to provide a switch and fuse unit which can be reinstalled conveniently and economically at a new location.

Summary of the invention

The novel modular electrical unit is comprised of a metal box having therein a fuse mounting, a wall-mounted switch and a wall-mounted jumper receptacle. A flexible power cable, having a plug at the external end thereof, enters the box and connects to the line side of the switch. The load side of the switch is connected to the line side of the fuse mounting. Means for connecting to a load enters the box and connects to the load side of the fuse mounting. This means may be a flexible cable connected directly to the load or may be a flexible cable having a load receptacle at the external end thereof. The jumper receptacle is connected to the line side of the switch.

The unit may be mounted or remounted on the frame of the machine motor stand to be powered or upon an adjacent wall or support. The unit provides the necessary safety features of a cut-off switch and a fused power line to a machine. Connections to the main power line and to the machine to be powered are through the flexible cables which do not require any installation. An additional modular unit may be added by plugging its power plug into the jumper receptacle of an installed modular unit. Thus, the number of connected units may be expanded or contracted as required.

Description of the preferred embodiments

Figure 1:
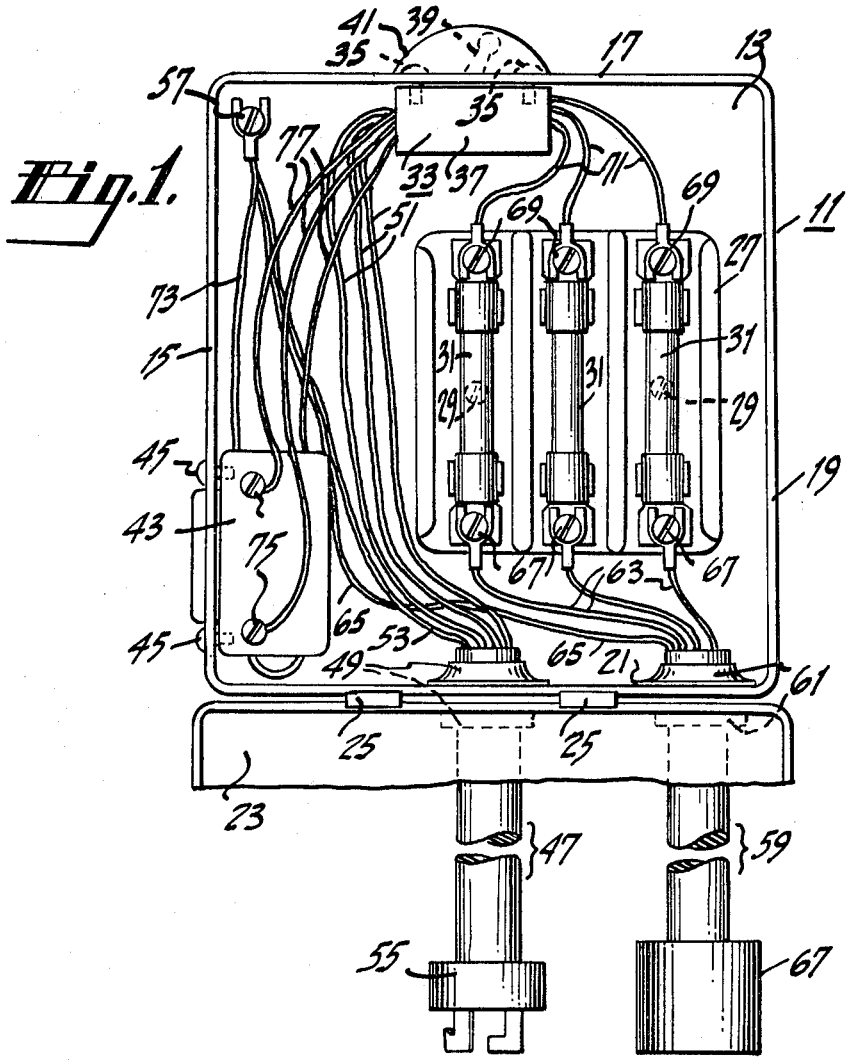
FIGURE 1 is a partially broken away front view of a novel modular electrical unit.
Figure 2:
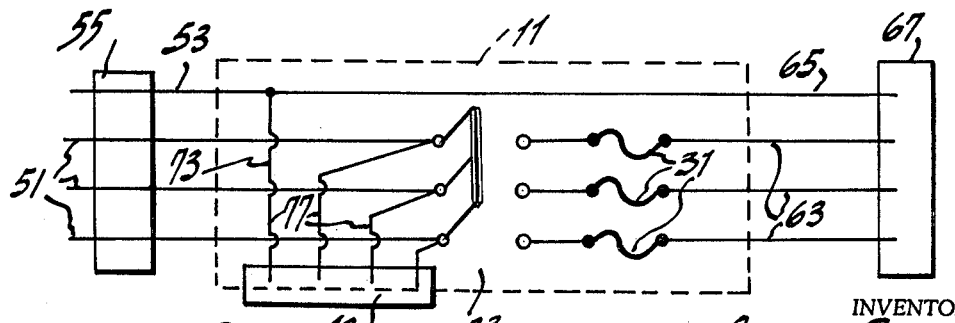
FIGURE 2 is a schematic diagram of the circuit of the unit illustrated in FIGURE 1.

The embodiment illustrated in FIGURES 1 and 2 comprises a metal box having a bottom 13, four walls 15, 17, 19, and 21, and a cover 23 (shown broken away) attached to one wall 21 with hinges 25. The cover is shown in the open position, but it is normally closed. The box may be of the type ordinarily used for fuse boxes and/or switch boxes with knock-out holes for mounting various devices thereon. The wall thickness of the box and the size of the box are not critical so long as the box has sufficient strength and size to carry the various devices described below. In the illustrated embodiment, the box is 6.5 inches by 6.76 inches by 2.5 inches deep with a wall thickness of about 0.07 inch.

A ceramic fuse mounting 27 is held to the inside bottom 13 of the box with screws 29, and three fuses 31 are mounted in the fuse mounting. A triple-pole single-throw switch assembly 33 is held to one wall 17 with screws 35. The switch assembly 33 is so positioned that the switch body 37 is within the box and the switch arm 39 extends out of the box through a knock-out hole in the wall 17. For safety, the switch assembly 33 includes a switch arm guard 41. The switch assembly 33 is not critical so long as it is of sufficient size and rating to carry the electrical load designed for the box. A jumper receptacle (female) 43 adapted for receiving a four prong plug (male) is held to another wall 15 with screws 45. The jumper receptacle 43 is wall-mounted so that the body thereof is within the box and the holes for receiving the prongs of a male plug (not shown) are presented through a hole in the wall 15.

A power line cable 47 enters the box through a first hole in the wall 21 and is held in place with a clamp fitting 49. The power line cable 47 has four wires. Three of the wires 51 (referred to as hot wires) are designed to carry 3 phase 220 volt current and the fourth wire (referred to as the ground wire) is intended to connect to ground. The external ends of the wires of the power cable 47 terminate in a four prong power line plug (male) 55. The internal ends of the hot wires 51 of the power line cable 47 connect to the terminals on the line side of the switch assembly 37. The internal end of the ground wire 53 connects to a common ground terminal 57 on the bottom 13 of the box.

A load cable 59 enters the box through a second hole in the wall 21 and is held in place with a clamp fitting 61. The load cable 59 has four wires. Three of the wires 63 (referred to as hot wires) are designed to carry 3 phase 220 volt current and the fourth wire 65 (referred to as the ground wire) is intended to connect to ground. The external ends of the wires of the load cable 59 terminate in a load receptacle 68 adapted to receive a four prong plug (not shown). The internal ends of the hot wires 63 of the load cable 59 connect to the terminals 67 on the load side of the fuse mounting 27. The internal end of the ground wire 65 connects to the common ground terminal 57. The terminals 69 on the line side of the fuse mounting 27 are connected to the three terminals on the load side of the switch assembly 33 with three wires 71.

The ground terminal on the jumper receptacle 43 is conected to the common ground terminal 57 with a ground wire 73. The three hot terminals 75 on the jumper receptacle 43 are connected to the three terminals on the power line side of the switch assembly 33 with wires 77.

In order to use the modular unit, the box is mounted on the machine stand to be operated or upon a nearby wall or support (not shown) by any of the means for mounting such a box. The switch 33 is put in the "off" position. The power line plug 55 is inserted into a power line receptacle, and the plug on the machine (not shown) is inserted into the load receptacle 68. The switch 33 is now put in the "on" position and the machine is ready to operate.

To add a modular unit, the box of the added unit is mounted as described in the foregoing paragraph. The switch 33 of the added unit is placed in the "off" position. Then, the power line plug 55 of the added unit is inserted in the jumper receptacle 43 of the prior unit. Then, the line plug (not shown) of the added machine is inserted in the load receptacle 68 of the prior unit. Then, the switch 33 of the added unit is put in the "on" position and the added machine is ready to operate. In this way, a plurality of modular units may be added, one to the other, each unit providing a switch and fuses for a different machine. Yet, only one connection need be made to the power line.

When rearrangement of machinery occurs, the modular unit may be disconnected and dismounted by reversing the above procedure, and a new arrangement of modular units may be made. Thus, the modular units may be reused and rearranged with no scrapping of any of the parts thereof and with a minimum of labor.

In another embodiment, the load receptacle 68 is omitted and the load cable 59 connects the load (not shown) directly to the fuse mounting 27. This embodiment or embodiments similar thereto may be required in some localities where a plug-in connection for the load is not approved. Nevertheless, these embodiments permit simple wiring and rewiring when machinery is first set up or is rearranged.

What is claimed is:

1. An article of manufacture comprising
   a metal box,
   a three-pole switch mounted in said box with the switch arm extending outside said box,
   a power line cable clamped at one end thereof to said box and entering said box, said cable including at least three wires, the three wires of said cable being connected to the line side of said switch inside said box,
   a plug connected to the end of said power cable outside said box,
   a mounting for three fuses attached within said box, one side of said mounting being connected to the load side of said switch,
   a load cable clamped at one end thereof and entering said box, said cable including at least three wires, the three wires of said load cable inside said box being connected to the other side of said mounting,
   a load receptacle connected to the end of said load cable outside said box,
   a jumper receptacle mounted in said box and adapted to receive a plug from outside said box,
   and at least three wires connecting the terminals of said jumper receptacle with the line side of said switch.

2. An article of manufacture comprising
   a metal box having at least two walls and a bottom,
   a three-pole, single-throw switch assembly wall-mounted in a wall of said box with the switch arm thereof extending outside said box,
   a power line cable clamped at one end thereof to said box and entering said box from outside thereof, said cable including three hot wires and a ground wire, the three hot wires being connected to the terminals of the power line side of the switch assembly, and the ground wire being connected to a common ground terminal on said box,
   a plug connected to the ends of said four wires of said power line cable outside said box,
   a mounting for three fuses attached within said box at the bottom thereof, the three terminals on the power line side of said mounting being connected with three wires to the three terminals on the load side of said switch assembly,
   a load cable clamped at one end thereof to said box and entering said box from outside thereof, said cable including three hot wires and a ground wire, the three hot wires being connected to the terminals on the load side of said fuse mounting, and the ground wire being connected to said common ground terminal on said box,
   a load receptacle connected to the ends of said three hot wires of said load cable outside said box,
   a jumper receptacle wall-mounted in a wall of said box and adapted to receive a plug from outside said box, said jumper receptacle adapted to have three hot terminals and a ground terminal,
   and three wires connecting the hot terminals of said jumper receptacle with the three terminals on the line side of said switch and a fourth wire connecting the ground terminal of said jumper receptacle with said common ground terminal on said box.

3. An article of manufacture comprising
   a metal box,
   a three-pole switch mounted in said box with the switch arm extending outside said box,
   a power line cable clamped at one end thereof to said box and entering said box, said cable including at least three wires, the three wires of said cable being connected to the line side of said switch inside said box,
   a plug connected to the end of said power cable outside said box,
   a mounting for three fuses attached within said box, one side of said mounting being connected to the load side of said switch,
   means for conecting a load to the other side of said mounting,
   a jumper receptacle mounted in said box and adapted to receive a plug from outside said box,
   and at least three wires connecting the terminals of said jumper receptacle with the line side of said switch.

4. An article of manufacture comprising
   a metal box,
   a three-pole switch mounted in said box with the switch arm extending outside said box,
   a power line cable clamped at one end thereof to said box and entering said box, said cable including at least three wires, the three wires of said cable being connected to the line side of said switch inside said box, a plug connected to the end of said power cable outside said box, a mounting for three fuses attached within said box, one side of said mounting being connected to the load side of said switch, a load cable clamped at one end thereof and entering said box, said cable including at least three wires, the three wires of said load cable which are inside said box being connected to the other side of said mounting, a jumper receptacle mounted in said box and adapted to receive a plug from outside said box, and at least three wires connecting the terminals of said jumper receptacle with the line side of said switch.

References Cited

UNITED STATES PATENTS

| | | | |
|---|---|---|---|
| 2,625,591 | 1/1953 | George | 317—99 |
| 3,122,681 | 2/1964 | Pusch | 317—120 |

LEWIS H. MYERS, Primary Examiner

D. A. TONE, Assistant Examiner

U.S. Cl. X.R.

317—116